USR-355 SR
2/3/87 OR H 000,212

United States Statutory Invention Registration [19]

[11] Reg. Number: H212
[43] Published: Feb. 3, 1987

Holder et al.

[54] DISPLACEMENT AND FORCE MEASUREMENT BY MEANS OF OPTICALLY-GENERATED MOIRÉ FRINGES

[75] Inventors: James D. Holder; Walter L. Hales, both of Huntsville, Ala.

[73] Assignee: The United States of America as represented by the Secretary of the Army, Washington, D.C.

[21] Appl. No.: 686,767

[22] Filed: Dec. 27, 1984

[51] Int. Cl.[4] ..... G01B 11/02
[52] U.S. Cl. ..... 356/356
[58] Field of Search ..... 356/354, 355, 356, 374

[56] References Cited

U.S. PATENT DOCUMENTS 3,354,311 11/1967 Vali et al. ..... 356/358
3,905,215 9/1975 Wright ..... 356/358 X

*Primary Examiner*—Stephen C. Buczinski
*Assistant Examiner*—Linda J. Wallace
*Attorney, Agent, or Firm*—Harold W. Hilton; Fred M. Bush; John C. Garvin, Jr.

[57] ABSTRACT

Apparatus for measuring force and displacement by measuring Moiré fringe shifts in response to relative movement between a pair of mirrors which reflect light beams therefrom to an interaction region. A pair of electro-optical sensors is positioned to view the interference region and detect fringe shifts responsive to relative movement between the mirrors.

3 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DISPLACEMENT AND FORCE MEASUREMENT BY MEANS OF OPTICALLY-GENERATED MOIRÉ FRINGES

DEDICATORY CLAUSE

The invention described herein may be manufactured, used, and licensed by or for the Government for governmental purposes without the payment to us of any royalties thereon.

BACKGROUND OF THE INVENTION

It is well known that when two or more regular patterns such as parallel strips are overlaid at a random orientation that a resultant larger regular pattern is formed called the Moiré fringe. This pattern is formed due to the periodic summation of periodic patterns which will vary from place to place if the two patterns are slightly displaced from identical overlap or are of slightly different geometry. If the patterns move with respect to one another the resultant Moiré fringe will be seen to move at a faster rate than the relative pattern motion.

The Moiré fringe effect has been used to make possible displacement measurements with instruments of limited resolution by virtue of the size and speed magnification effects. These systems use either systems of grating transparencies or slotted plates for the reference patterns. Since there are limitations to the physical characteristics and definition of such devices, a purely optical system can be of advantage. With the advent of inexpensive laser diodes, a practical source of monochromatic light is available.

SUMMARY OF THE INVENTION

Apparatus for displacement and force measurement by means of optically-generated Moiré fringes. A pair of optical sensors and an associated counting device is used to measure the number of fringes passing the sensors as well as their phase relationship. The total displacement is proportional to the number of fringes passing a given photodetector. Measurement of the phase relationship of the fringes determines whether the net displacement is (+) or (−).

DESCRIPTION OF THE PREFERRED EMBODIMENT

Figure 1:
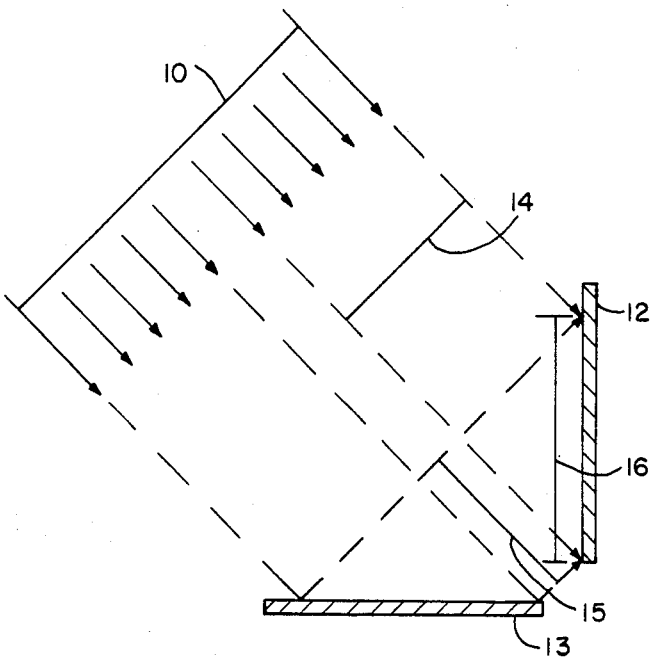
FIG. 1 PRIOR ART
FIG. 1 is a diagrammatic view illustrating typical apparatus for interference fringe generation.

Referring to FIG. 1 which illustrates a typical interference fringe generation, if a beam of monochromatic light 10 is projected simultaneously onto a screen 12 and a mirror 13, and the beam reflected from the mirror overlaps the direct beam 14, an interference fringe will be generated on the screen 12 at the location 16 on the screen. This fringe is due to the constructive and destructive interference of the wavefronts of the monochromatic light.

Figure 2:
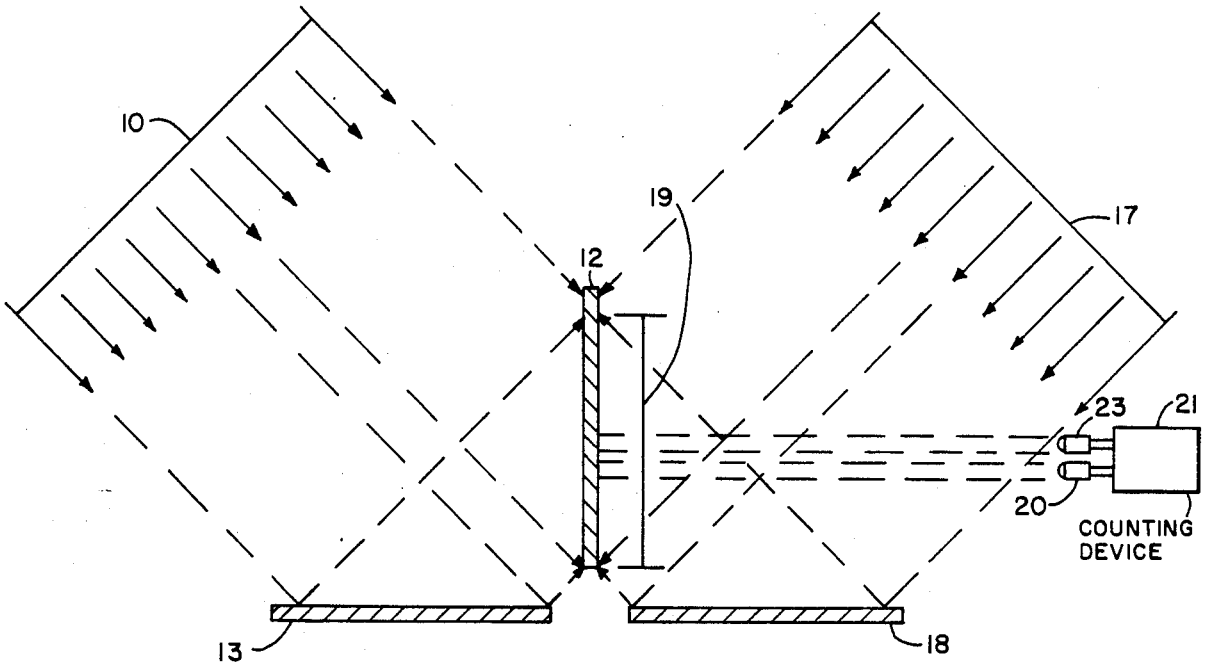
FIG. 2 is a diagrammatic view illustrating a pair of relatively movable mirrors for reflecting light beams to a translucent screen and optical sensors for detecting fringe patterns.

In FIG. 2, it is seen that if the screen 12 is translucent, and another light beam 17 and mirror 18 is placed, two interference patterns will be overlapping at the region 19 on the screen. This overlapping of these patterns will result in the Moiré fringes being generated in the region 19. The fringe will move with great sensitivity to the relative positioning of the two mirrors 13 and 18. If suitably-focused electro-optical sensors 20 and 23 are positioned so as to view screen 12, then as the Moiré fringe shifts in response to physical movement of the mirrors 13 and 18 a varying electrical signal will be generated as each fringe passes the viewing position. A measure of displacement can be made by counting the number of light-dark transitions as the fringes shift by a counter 21.

A complication to the counting of fringe passage for displacement measurement is that if the motion reverses, the count must subtract rather than add. This problem has been solved by the use of two optic sensors placed at a 90-degree phase relationship (quadrature) with the Moiré period. In this case, the two sensor's outputs are compared for lead or lag relationship and the counting device is set to count up and down accordingly. Other implementations of this design are available which will enhance the performance such as desensitizing to vibration.

Figure 3:
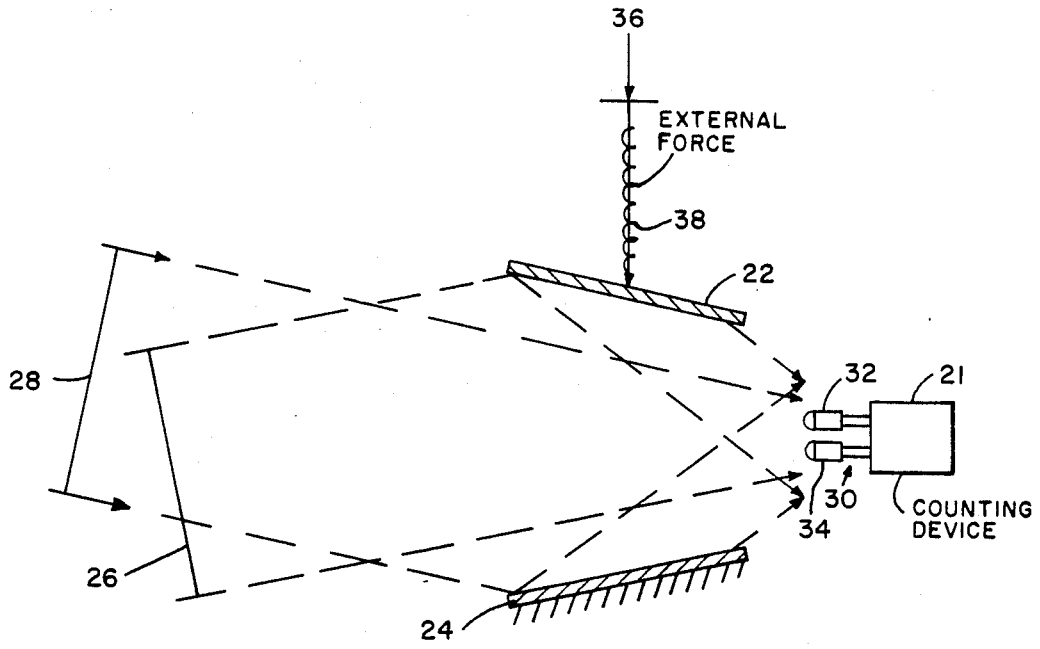
FIG. 3 is a diagrammatic view illustrating apparatus for interference fringe generation using a fixed and a movable mirror and optical sensors for detecting fringe patterns.

The interference patterns and the resulting Moiré fringes are generated regardless of the presence of a screen. Omitting the screen will not only lower the cost of such a system, but will enhance the performance since the light scattering of the screen is eliminated. This will result in sharper Moiré fringes and better performance of the optic detectors. A system for accomplishing this is shown in FIG. 3. As shown in FIG. 3, a movable mirror 22 and a fixed mirror 24 is provided to reflect portions of the monochromatic light beams 26 and 28 respectively. The reflected beams, together with their direct portion, all arrive at the interference region 30 where the fringes are generated by the interaction of the light wavefronts. In this region a pair of optic sensors 32 and 34 are placed so as to detect the light and dark patterns of the Moiré fringe. The spacing between 32 and 34 is at the quadrature of the Moiré period as discussed above. If an external force 36 is applied to the movable mirror 22, the fringe will shift due to the changing interference patterns in a very sensitive manner. In this situation a displacement of the mirror and its attachment can be very precisely measured. If the movable mirror 22 is restrained by a springy medium 38, then a quite sensitive force measurement may be made knowing the displacement against a known spring rate.

The system described can be made to measure with great accuracy limited only by the light wavelengths and diffraction effects. Using the present-day semiconductor laser devices and photodetectors and the counting techniques already developed, a very sensitive, accurate, and economical method of displacement and force measurement can be produced.

We claim:

1. Apparatus for displacement and force measurement by means of optically-generated Moiré fringe patterns comprising:

a. a movable mirror and a fixed mirror positioned in spaced relation;

b. a pair of light sources disposed for directing separate light beams to said mirrors; said mirrors disposed to reflect portions of said light beams to an interference region where fringes are generated by interaction of the light wavefronts; and, c. a pair of optic sensors positioned in said interference region to detect light and dark patterns of said fringes.

2. Apparatus as in claim 1 wherein said optical sensors are photodetectors.

3. Apparatus as in claim 2 wherein said movable mirror is moved by an external force and restrained by a springy medium.

* * * * *